UNITED STATES PATENT OFFICE.

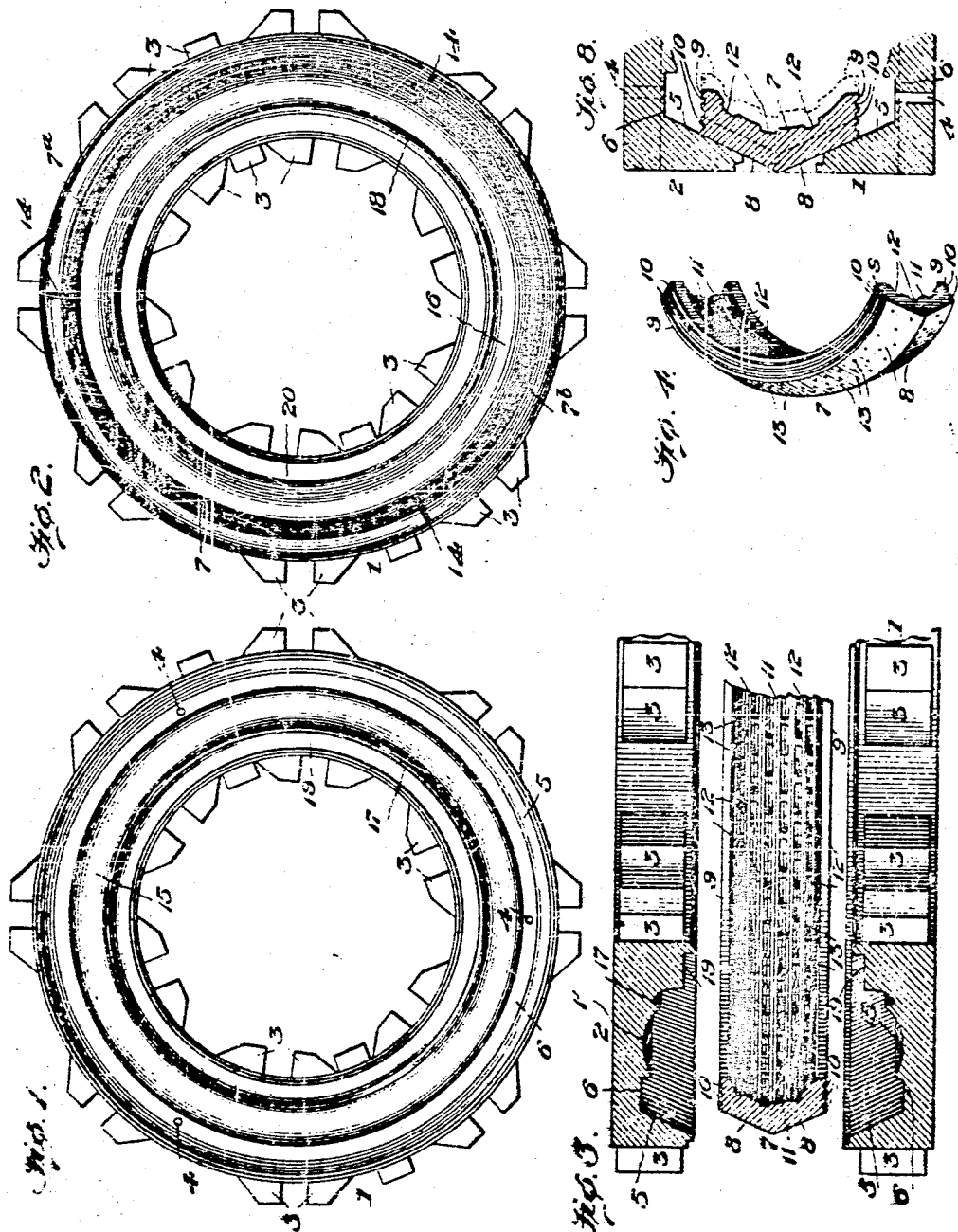

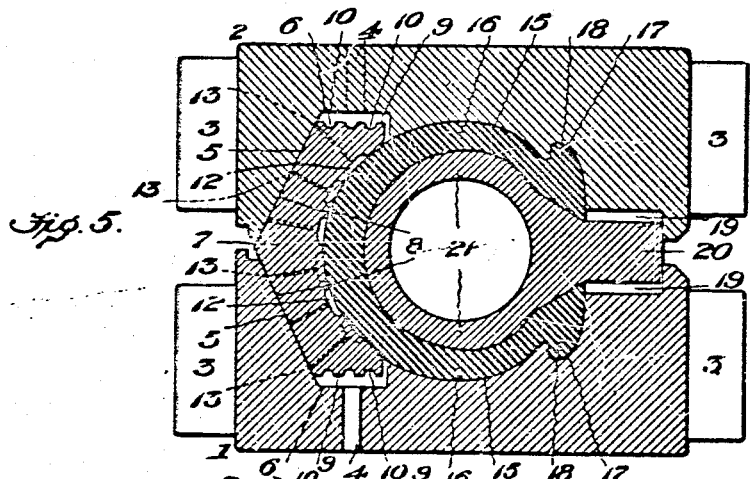
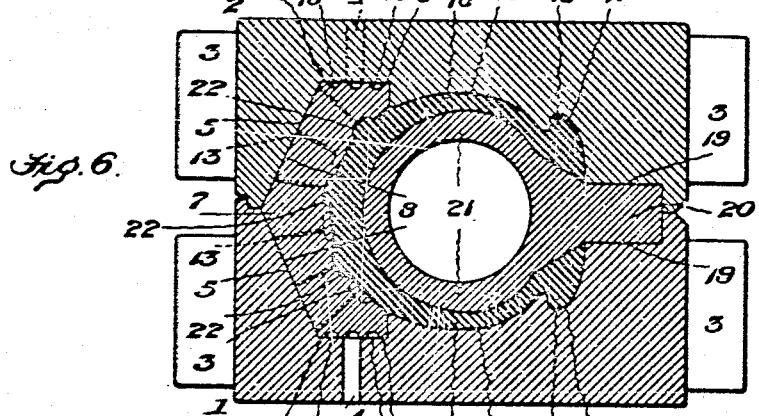
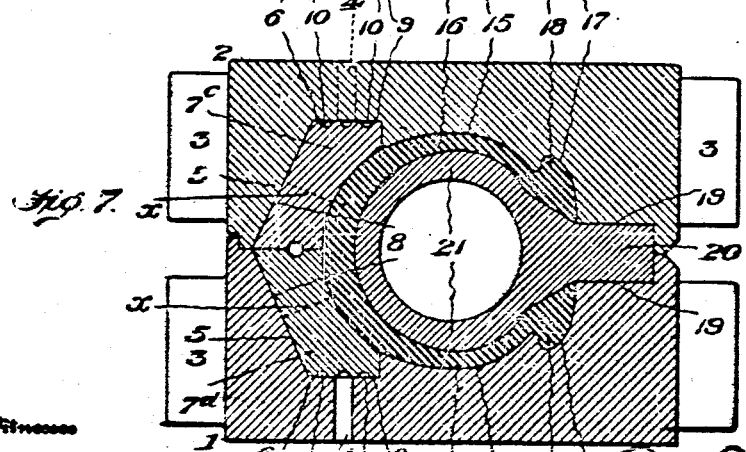

TOD J. MELL, OF YOUNGSTOWN, OHIO, ASSIGNOR TO THE REPUBLIC RUBBER COMPANY, OF YOUNGSTOWN, OHIO, A CORPORATION OF OHIO.

MOLD AND MOLD EQUIPMENT.

No. 906,256.     Specification of Letters Patent.     Patented Dec. 8, 1908.

Application filed August 15, 1908. Serial No. 448,693.

*To all whom it may concern:*

Be it known that I, TOD J. MELL, a citizen of the United States, residing at Youngstown, in the county of Mahoning and State of Ohio, have invented certain new and useful Improvements in Molds and Mold Equipment; and I do hereby declare the following to be a full, clear, and exact description of the invention, such as will enable others skilled in the art to which it appertains to make and use the same.

My invention relates to molding apparatus, or the art of forming or shaping articles of merchandise in separable flasks, but has reference more particularly to the molds and mold equipment employed in the manufacture of elastic vehicle-tires or other rubber goods of like character.

This invention has for its object, among others, the production of molds of greater general efficiency than those heretofore employed for similar purposes; molds capable of imparting to articles formed therein a longitudinal as well as transverse pressure; molds which are peculiarly adapted and arranged for the release of articles manufactured therein; and molds the structural arrangement whereof insures the greatest stability, certainty of action, and durability, economy in the mold equipment, and a consequent economy of storage space required in the factory.

In the accompanying drawings which form part of this application, and illustrate, for example, a mold and the mold equipment for manufacturing automobile or other resilient tires: Figure 1 is an interior plan view of one mold member, Fig. 2 represents the same with a transversely divided tread-ring resting therein, Fig. 3 is a fragmentary transverse sectional view through two coöperating mold members, and an intervening tread-ring section, Fig. 4 is a perspective view of one tread-ring section detached, Fig. 5 is a vertical transverse section through both mold members immediately before closing, showing also a tread-ring, a tire, and the core upon which it was shaped, Fig. 6 is also a vertical sectional view of parts shown by Fig. 5 after closing, Fig. 7 is a view corresponding with Fig. 6, but embodying one modified form of tread-ring, and Fig. 8 is a diagrammatic view showing portions of two mold members in the act of closing upon a tread-ring section or matrix to advance same radially, as indicated in dotted lines, during the process of molding.

Reference being had to the drawings and numerals thereon, 1 indicates the lower and 2 the upper coöperating metallic mold members of ordinary exterior configuration, provided with the usual circumferential bolt-lugs 3 to facilitate securing them together. These members 1 and 2 are perforated at suitable points, as at 4, by outlet vents for the escape of any surplus rubber during the process of molding; while the interior of said members, which are counterparts one of the other, are each configured by a tread-ring or matrix-seat having a conical outer wall 5, and a horizontal depression 6. Within the seat aforesaid is located a tread-ring or matrix 7, which may comprise a unitary annulus, may be divided in one or more planes circumferentially, may be divided at three or more points transversely, or may be divided both circumferentially and transversely without departing from the spirit of the present invention. In either event, however, said matrix is provided with a conical outer edge 8 designed, arranged and adapted to mate with the aforesaid conical walls 5 of the mold members. It is further provided with opposing horizontal edges 9, 9 having surface grooves 10 therein for purposes that will later appear, and its inner curved face 11 is configured by a counterpart of the design which is to be imparted to the tread surface of a tire or other article in the course of manufacture.

The accompanying illustrations exemplify the present invention in its applicability to the manufacture of automobile tires having tread-surfaces configured by a multiplicity of independent elongated studs, circumferentially arranged in parallel planes; and to this end the concave face 11 of the tread-ring or matrix 7 is indented by suitable depressions 12, each vented outwardly as at 13 to permit the escape of air from said depressions during the process and operation of molding. Moreover, the tread-ring or matrix herein shown, for example, is divided transversely, as at 14, into three or more segmental sections 7, 7ª, 7ᵇ, to facilitate the process of molding, and also that of removing the completed tire from the mold, as will later appear.

Adjacent to the tread-ring or matrix 7 when its horizontal edges 9 are properly seated in their corresponding depressions 6, the mold members 1 and 2 are each configured by an annular concavity 15 which forms the sides 16 of the molded tire; while adjacent to this in each of said members 1 and 2, another circular indentation 17 provides similarly for the clencher beads 18 of the tire, and a circular radial depression 19, half in the mold member 1 and half in the member 2, receives the web 20 of an annular core 21 upon which the superstructure of the tire is originally built.

This being a description of my invention in its preferred construction and arrangement of parts, I will now proceed to describe its mode of operation when a segmental tread-ring is employed for producing tires with elongated studs upon their tread surfaces as shown.

A tire having been roughly shaped in the usual manner upon the annular core 21, is first introduced into one mold member 1 simultaneously with a complete surrounding segmental matrix 7, 7ª, 7ᵇ, as indicated by Fig. 2, its lower outer conical edge 8 engaging the correspondingly angled conical wall 5 of the mold member. At this stage the matrix 7 is held off and prevented from seating itself by a surplus of rubber in the unfinished tire, as shown by Fig. 5; and, the upper mold member 2 next being lowered into place, engages by its conical outer wall 5 the upper conical edge 8 of the segmental matrix 7 as also clearly shown by Figs. 5, 6, 7 and 8. The mold members may now be secured together by bolts (not shown) engaging bolt lugs 3 in the usual manner for the purpose of securing all parts in their proper relative position until such time as the final molding pressure is applied.

As is well understood by those skilled in the art, the mold and its contents are next subjected to a suitable degree of heat, during the process of curing, for the purpose of reducing the roughly shaped tire to a proper state of plasticity. This accomplished, in any approved manner, hydraulic or other pressure, is applied to the co-acting mold members 1 and 2 thereby closing them as indicated by Fig. 6. As a result, the segmental matrix 7, 7ª, 7ᵇ is contracted diametrically, or, in other words, advanced radially as best shown by diagrammatic Fig. 8, from its original position to that indicated by dotted lines in said figure. Thus, in addition to the usual transverse pressure, the tire is compressed radially, upon its tread-surface or point of greatest strain, to materially increase its durability and decrease its liability to punctures, this same pressure serving to fill the depressions 12 in the tread-ring or segmental matrix 7 and produce the surface studs 22 shown by Fig. 6 of the drawings.

During the formation of said surface studs 22 it will be apparent that the depressions 12 are vented by way of the individual outlets 13 as the rubber enters; and all surplus material over and above that required for a tire in the course of formation finds its way between the adjacent surfaces of mold members 1, 2 and the co-acting matrix 7, to the horizontal grooves 10 in the latter. These grooves 10 in turn conduct the surplus rubber to the perforations 4 by which it is permitted to escape.

In addition to the functions heretofore ascribed to the conical arrangement and nested relation of the mold walls 5 and the outer edge of matrix 7, there will be noted the no less important function of safeguarding the said matrix from undue strain during the closing of mold members 1 and 2 upon it. In other words, the said contacting surfaces 5 and 7 at all times have a plain parallel bearing which uniformly distributes the pressure over the outer edge of the matrix, as distinguished from structures in which the matrix has a convex outer edge and the mold members a corresponding concave outer wall, and in which the innermost advance edges of the mold members first engage the matrix at a single point with full pressure, thus subjecting the matrix to a serious cracking strain.

What has been said of the preferred form of construction is in a measure true of modifications which employ circumferentially divided tread-rings rather than segmental, for the purpose of manufacturing tires with comparatively shallow tread-surface corrugations, or a plain tread as represented by Fig. 7. This figure shows a tread-ring formed in two corresponding circumferentially divided sections 7ᶜ, 7ᵈ which may be readily separated when the mold is opened to release the completed tire; or the said matrix may again be divided as indicated by the dotted lines x, x when arranged for deep corrugations; and in like manner various changes and alterations may be made in the parts herein shown and described without departing from the invention which will now be set forth in the following claims.

I claim—

1. In an annular mold the combination with oppositely arranged mold members, of an interior matrix said members and matrix having co-acting inclined faces.

2. In an annular mold the combination with co-acting mold members having an interior matrix-seat with inclined outer walls, of a matrix having its periphery formed with corresponding inclines.

3. In a mold the combination with co-acting mold members, each having an interior matrix-seat with conical outer walls, of a matrix having a conical outer edge corresponding with said outer walls.

4. In a mold the combination with co-acting mold members each having an interior matrix-seat, of a segmental matrix, and means whereby the matrix is moved with respect to the mold members during the process of molding.

5. In a mold the combination with co-acting mold members each having an interior matrix-seat, of a segmental matrix, and means whereby the diameter of said matrix is automatically reduced during the process of molding.

6. In a mold for vehicle tires the combination with co-acting mold members each having an interior seat, of a tread-ring divided transversely and provided with a conical outer surface.

7. In an annular mold for vehicle tires the combination with counterpart mold members, of a segmental tread-ring, and means whereby said tread-ring is contracted automatically during the process of molding.

8. In an annular mold for vehicle tires the combination with counterpart mold members each having a tread-ring seat, of a segmental tread-ring adapted to engage both of said seats, and means whereby said tread-ring is contracted automatically during the process of molding.

In testimony whereof I affix my signature, in presence of two subscribing witnesses.

TOD J. MELL.

Witnesses:
J. F. McSEIVRE,
FRED J. HEIM.